Oct. 15, 1940.  M. J. MacDONALD ET AL  2,218,047
HARDENABLE PLASTIC ARTICLE
Original Filed May 2, 1936   2 Sheets-Sheet 1

INVENTORS
MURRAY J. MAC DONALD
CARL SCHWENDLER
FREDERICK C. SCHWENDLER
BY CHRISTOPHER S. SCHWENDLER

ATTORNEY.

Oct. 15, 1940.  M. J. MacDONALD ET AL  2,218,047

HARDENABLE PLASTIC ARTICLE

Original Filed May 2, 1936   2 Sheets-Sheet 2

INVENTORS
MURRAY J. MACDONALD
CARL SCHWENDLER
BY FREDERICK C. SCHWENDLER
CHRISTOPHER S. SCHWENDLER

ATTORNEY.

Patented Oct. 15, 1940

2,218,047

UNITED STATES PATENT OFFICE 2,218,047

HARDENABLE PLASTIC ARTICLE

Murray J. MacDonald, Carl Schwendler, Frederick C. Schwendler, and Christopher S. Schwendler, Long Island City, N. Y., assignors to National Casket Company Incorporated, Long Island City, N. Y.

Application May 2, 1936, Serial No. 77,593
Renewed March 2, 1940

11 Claims. (Cl. 27—7)

The present invention relates to articles made from hardenable plastic compositions.

The illustration is in connection with caskets suitable for burial purposes, which is by way of example.

It is one object of our invention to provide a casket formed from hardenable plastic compositions, the outer surfaces of which may be directly painted, lacquered or similarly decorated by brushing, dipping or spraying, so that the article is commercially acceptable without expensive preparatory treatments, coverings and the like.

It is another object of our invention to provide a casket, formed of a suitable composition, in which surface ornamentations in the form of inserts may be cast into the various outer walls of the casket, and also if desired, strips may be molded into the inner walls and cover of the casket for the use of the upholsterer in tacking in linings and padding, and various articles of hardware such as locks, hinges, handles, etc.

It is another object of our invention to provide articles made of a hardenable plastic composition that are water-proofed, the water-proofing being either included in the ingredients of the composition or subsequently applied.

It is still another object of our invention to provide a casket formed of hardenable plastic composition in which there is a smooth, hard, finely textured, dense outer surface backed up by a lighter weight, thicker, less dense, plastic material of substantial mechanical strength and of different composition from the surface material.

It is a further object of our invention to provide a casket formed of hardenable plastic composition in which are included chemically inert, light weight, water-proof, cellular filling materials, and in which the hardenable plastic becomes a solid solution upon setting.

It is a still further object of our invention to provide a casket formed of hardenable plastic composition capable of cold, non-pressure molding, to produce parts which are flexible, non-cracking or checking, and shock-proof, and which will not warp during setting and use.

It is a still further object of our invention to provide a casket formed of hardenable plastic composition that can be built up into a laminated structure using reinforcing materials which are light in weight and do not of themselves have sufficient mechanical strength to add greatly to the strength of the composition over and above its inherent strength, but which may add other qualities such as resiliency.

It is an even further object of our invention to provide a casket formed of hardenable plastic composition, which is resistant to water vapor, water, alkalis, atmospheric influences, soil, body and medicinal acids, body fats, the products of decomposition of tissue and flesh, and those preservative chemical products used in the preparation of a body for burial.

An even further object of our invention is to provide a casket formed of hardenable plastic composition which is capable of "breathing," i. e., responds to the humidity conditions surrounding it and permits the escape of gases without transmitting water.

An even further object of our invention is to provide a casket formed of hardenable plastic compositions in which the coefficient of expansion is such that parts of caskets and other articles can be cast therefrom and used interchangeably.

It is a further object of our invention to provide a casket formed of hardenable plastic composition, and a method of making the same, which is inexpensive and economical.

As a full exposition of the object of my invention would unduly lengthen this specification, the other and further objects of my invention will be understood from the following specification taken in conjunction with the accompanying drawings, wherein—

Figure 1:
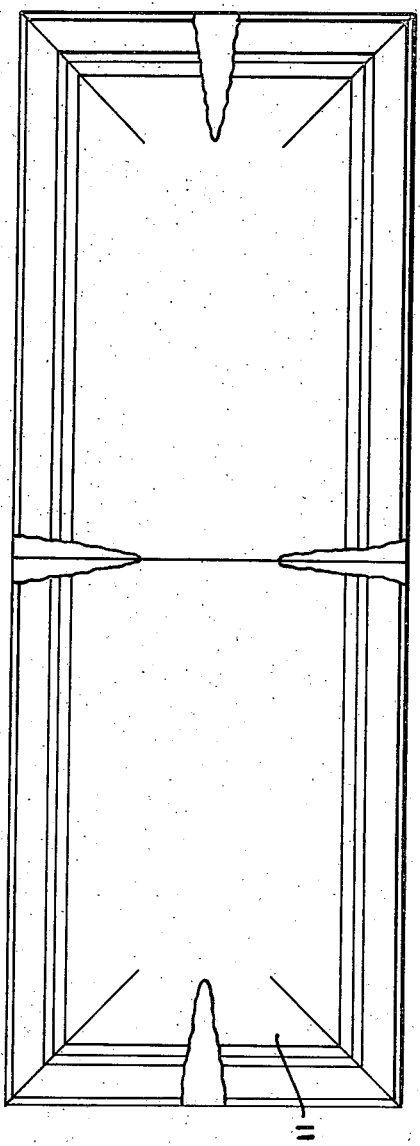
Figure 1 is a top plan view.

Heretofore in the use of cement and other plastic compositions for producing bulky articles, such as burial caskets, there has been great objection to the excessive weight and to inherent weaknesses or characteristics, as well as to the relatively small structural strength thereof. This has been especially true when making thin walled articles.

Other objections have been the poor surfaces, the products have been readily affected by water, soil and weather conditions, or it has not been practical to finish the same by painting, varnishing, etc., or the product has been too brittle.

In producing the caskets of our invention we preferably cast or mold the same without the use of heat or pressure, one method being fully explained in the copending application Ser. No. 77,594, filed May 2, 1936. The cover, in one or two pieces according to the style, and the side and end panels and the bottom are cast separately and assembled together, or the assembly can be done with a bottom made in place. Ornamentation of the casket may be obtained in part by designs that are incorporated in the molds, or in part by the addition of medallions, corner pieces, etc., which are separately molded and applied to the casket. Surface decoration is obtained by painting, etc., the outer surfaces in any of the ordinary manners of painting woods and metals.

The plastic compositions used may be made according to several different formulae by which the desired characteristics outlined above may be obtained. One such formula to be used for the body portion, or back portion, in the composite structure we have found suitable for our purposes is as follows: about equal parts of calcined magnesite (ground fine) and silex ($SiO_2$) (ground medium fine) to which may be added as desired light weight, cellular and bulky filler materials such as hardwood sawdust, asbestos, wood flour, etc., to a total of about two-thirds of the amount of magnesite.

This material is rendered plastic by an amount of plasticising fluid about equal to the combined amounts of the magnesite and silex. The plasticising fluid consists of magnesium chloride and water, in the proportions of a little more than two-thirds the quantity of magnesium chloride to the amount of water, to which mixture is added sufficient magnesium sulphate to precipitate out the active calcium present in the mixture.

In producing the surface material of the above mentioned characteristics, the magnesite and silex are increased in proportion and the bulkier filler materials are omitted.

In either case, the water-resistant characteristics of the foregoing materials may be enhanced by adding to the mixes an ingredient such as asphaltum in either a powdered form or as an emulsion.

Briefly, the method of molding the panels and cover consists in applying to the surface of the mold a thin layer of coating or surface material, applying thereover a fine mesh netting, over which is applied a second thin layer of surface material. Behind this may be placed a lamination of the heavier plastic backing material referred to, to make the wall of whatever thickness is desired. For burial caskets we find that a wall of a total thickness of from one-half to three-quarters of an inch is ample. If desired, this layer of backing material may be laminated with one or more layers of coarse mesh fabric netting or fine or coarse mesh wire netting as hereinafter described.

After the various materials are placed in the mold the mass may be rolled or troweled to an even thickness which operation also imbeds the several nettings in the plastics and causes the fine mesh netting to be pressed toward the outer surface. The fine mesh netting insures an even distribution of the surfacing material so that when the part is removed from the mold there is a hard, smooth, fine textured outer surface distributed over the entire area. The fine mesh netting may be dispensed with especially when adding short fibre asbestos as an ingredient of the surface material described above and decreasing the amount of calcined magnesite and silex. The thoroughly dispersed asbestos is held in place by reason of the viscosity of the material apparently forming a fibrous net work therethrough.

In the finished product the line of demarcation between the different layers is extremely indefinite because of the homogeneous uniting of the surface material and the backing material, and the several layers of each, the whole thus becoming one monolithic structure. Of course, the texture of the surface and filler materials is distinctive.

Where, as in the casket of this application, the article is made of several separately cast parts afterwards assembled together, a cementing mix that may be used is closely similar to the above described surface mix except that less of the bulky filler material is used, and slightly more magnesite. By the use of such a cement the interfaces of the assembled parts become indefinite and the assembled structure becomes a monolith having the same characteristics as the individual parts and as if the article were cast in one piece originally.

It should be pointed out that the magnesia base substances described have a sufficient inherent structural strength to be useful even in large articles such as burial caskets without any structural reinforcement. Certain safety factors are obtained by the use of the light weight reinforcements which are indicated. By using a surface material that does not contain light weight, bulky filler materials an outer surface is obtained which is hard and smooth and finely textured, free from blow holes, pits or pin holes, etc., and which is ready for immediate paintings, lacquering or similar decoration without any preliminary treatment of the surface. This is a considerable advantage in producing caskets and similar things which require different finishes to suit the varying tastes of the buying public.

In molding the various components parts, inserts may be made at the time of molding, if desired, such as latches, wooden frames, hinges, ornamental panels, cores, etc.

No attempt has been made in the drawings in this application to illustrate any elaborate surface decorations or hardware on the casket or its component parts.

Figure 2:
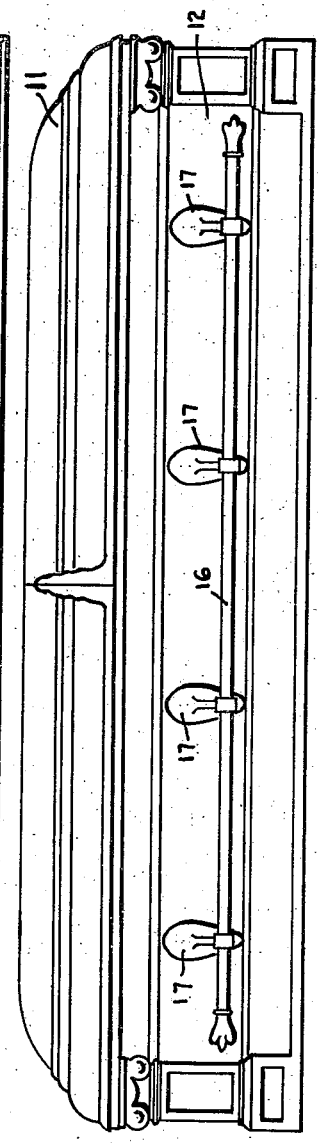
Fig. 2 is a side elevation.
Figure 4:
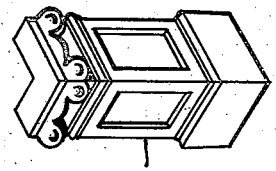
Fig. 4 is a perspective view of a separate corner post medallion, if such a construction is used.
Figure 3:
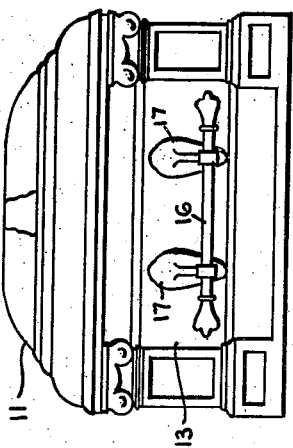
Fig. 3 is an end elevation of a burial casket constructed in accordance with our invention.
Figure 6:
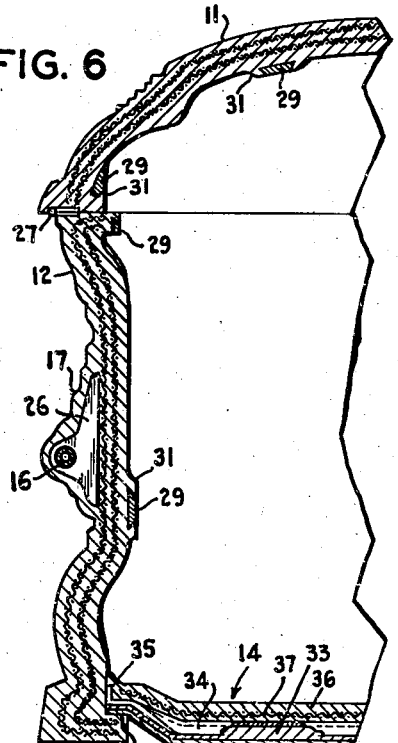
Fig. 6 is a fragmentary vertical section through a casket constructed according to our invention.

However, in Figs. 1, 2 and 3, there is shown the general construction of a casket, comprising the cover 11, side panels 12, and end panels 13. The bottom 14 is shown in Fig. 6. In this construction one-half of each of the corner posts is cast integral with each of the side and end walls so that when the parts are assembled together, the effect of a complete corner post is given. If desired, these corner posts may be formed as separate medallions as indicated at 15 in Fig. 4, the same being fastened in place on the assembled casket by the above referred to assembly cement.

Hand grip bars 16 are fastened on the side and end panels in mounting blocks 17 to be hereinafter more fully described. While the continuous rigidly mounted bar type of hand grip is shown, other types well known in the industry may be used. Also, as seen from Fig. 1, the cover 11 is divided into two sections, permitting one or both halves of the cover to be opened at the will of the customer, but the cover can be cast in one piece.

Referring now to the detailed construction of the casket: As has been explained above, the hard, smooth, outer surface 21 is obtained by applying a coating of surface composition to the mold, after which a fine mesh, cloth netting 22 is applied, followed by another coating of surface composition 23. Since the fabric becomes imbedded in the outer layer 21 which is originally very thin, being merely brushed on the surface of the mold, this netting is very near the outer surface of the article. It therefore aids in obtaining an even distribution of the composition over the entire surface area of the mold so as to eliminate holes, pits and other blank spaces.

The netting also increases the factor of flexibility of the outer surface under sudden shocks and strains, aiding in causing an even distribution thereof. It is not practical to show these exact arrangements in the drawings, so that these parts appear in Figs. 7 and 8 as separate and distinct layers, which is not the case in the finished article. Likewise, proportions are considerably exaggerated in all the figures for the sake of clarity.

Since the surface coating is denser and heavier than the backing or body about to be described, and since one object is to secure an article that is light in weight, it is not necessary that more than a thin layer of surfacing material be provided even in the composite structure described. (On the other hand, complete articles may be made from this surfacing material, as for example, the corner post medallions 15.)

Figure 5:
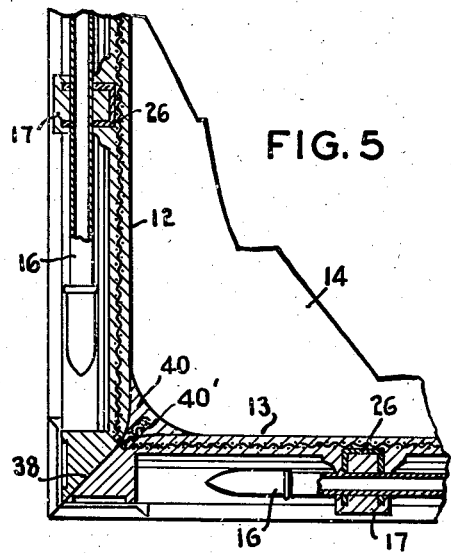
Fig. 5 is an enlarged fragmentary horizontal section of one corner of an assembled casket.
Figure 7:
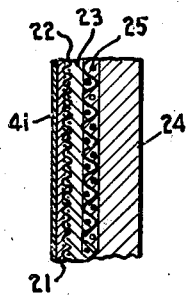

After the layer of surface material is formed as described, the body or backing is applied thereto, to whatever thickness desired. It has been found advantageous to laminate this body or backing by applying alternate layers of the plastic body composition 24 and netting 25. One of these nettings may be located at the intersection between the surface material and the body material as shown in Fig. 7. One or all of the nettings 25 may be cloth fabric, or they may be fine mesh wire screen, which in themselves are light and flimsy and of little mechanical strength. For some purposes it has been found sufficient to provide a single, coarse mesh wire screening. In the casket of Figs. 5 and 6, we propose to make the arched cover 11 and the side wall 12, as well as the end wall 13, using three fine mesh wire screens.

The mounting blocks 17 are molded integral with the side and end panels in the form of casket shown in Figs. 5 and 6 by suitable provision in the mold. Each block has a U-shaped insert 26, the flat portion of which is located within the area of the side and end walls shown in Figs. 5 and 6. The arms of each of the inserts 26 have registering apertures through which the bar 16 passes.

The cover is hinged to the rear wall as shown at 27 in Fig. 6, the separate parts of the hinge being located in countersunk portions provided respectively in the top of the rear wall and the lower edge of the cover. On the opposite side the cover is latched to the front wall as indicated at 28, the parts of the latch being located in appropriately counter-sunk portions of the front wall and the lower edge of the cover as indicated in Fig. 9.

Figure 9:
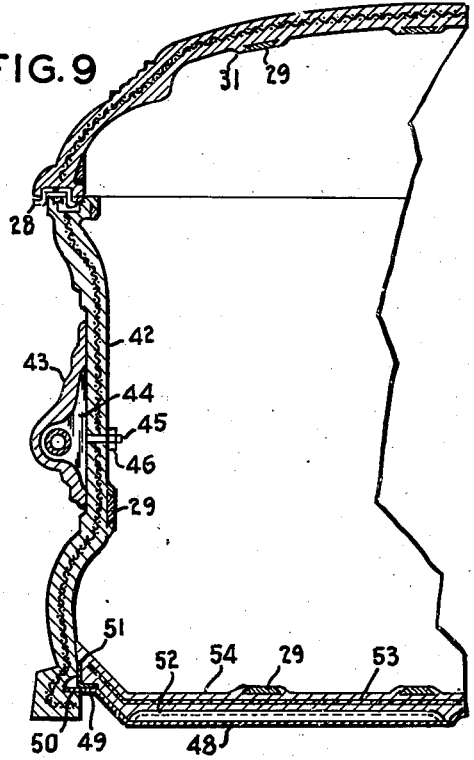
Fig. 9 is a fragmentary vertical section illustrating a modified form of casket construction.

As indicative of other inserts that may be located on the surfaces of the parts, a series of wooden strips 29 are shown secured on the interior of the casket in Figs. 6 and 9 by merely having the plastic material filleted over the tapered sides of the strips as indicated at 31. These wooden strips are placed in the casket for the convenience of the upholsterer in adding linings, etc. It will be apparent that other surface plates may be applied, such as decorative or name panels.

In the casket shown in Figs. 5 and 6, the bottom 14 is likewise a separately cast, built-up laminated structure. In this instance, a thin layer of surface material is provided at 32, backed up by a layer of the lighter weight backing material 33. A series of spaced apart cross bars 34 may be next placed in position. These bars are strips of sheet metal formed in the shape of a V, with the broad portion facing downwardly with the material 33 filling or extending into the V-shaped part. At both sides of the casket the ends of the bars 34 are bent at right angles to form ears 35. The ears extend either parallel with the outer side edges of the bottom, or slightly beyond the same, in either case positioning the bottom with respect to the side walls or vice versa.

The bottom may be secured to the side walls by screws passing through the ears, although this is not necessary. Above the cross bars 34 are placed alternate layers of filling material 36, and cloth or wire screens 37. From two to seven layers of these screens may be used, and the cross bars 34 may be omitted if desired, or may be located between the screens.

After the separately molded top, sides, ends and bottom, are prepared as indicated above, there is a period of setting of from two to ten hours in the mold, followed by a period of aging of from seven to twenty-one days, or its equivalent, in open racks. The parts, then ready to be assembled, are placed in an assembly rack, one of the end pieces being inserted first, followed by two sides. These three pieces are secured together along the several interfaces thereof, as indicated at 38 (Fig. 5), by the cementing solution described above. Again it is not practical to show in the drawings the indefinite line of demarcation between the adjoining interfaces. Next, the bottom 14 is slid in place, the bottom resting upon the inwardly extending shoulders 39 which are cast integral with the side and end walls. The opposite end wall 13 is then put in place, with its shoulder 39 beneath the bottom, and cemented along its beveled corners. After this is completed, the bottom is cemented in place along the side and end walls, using the above outlined cementing solution, thus making it an integral part of the whole structure, rendering the casket water-proof, etc., as outlined above. If desired, the various corners may be provided with fillets of the plastic material as shown at 40 (Fig. 5) in which event the nettings or screens 25, or sections thereof, used in the side and end panels, project beyond the beveled faces thereof and are brought to the interior of the casket, as shown at 40', and where they may be folded together, in position to extend into the fillet 40.

The cover is next fastened in place and the casket is ready to be finished.

Figure 8:
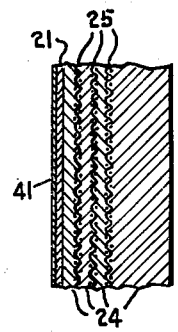
Figs. 7 and 8 are enlarged details illustrating the laminated construction of the walls of the casket.

The nature of the plastic material is such that the casket may be treated just as metal and wood caskets or other articles are treated when painted. A priming coat is applied followed by the paint of whatever color desired, and tinting if called for, and then finished off by varnishing or lacquering, waxing, and rubbing down. This paint layer is indicated in Figs. 7 and 8, at 41.

After the painting is completed, the casket receives its hardware and lining preparatory to shipping and use.

The casket of Fig. 9 illustrates a modified construction. In this case the side wall 42 and the hand grip mounting blocks 43 are cast separately. The U-shaped inserts 44 each have a bolt 45 secured to the rear connecting portion thereof and extending beyond the block. The bolts 45 are received in appropriate holes in the side and end walls, and each is secured in place by a nut 46, in addition to which the block may be cemented to the outer face of the walls as in the case of the corner medallions 15. In this construction, the flat connecting portion of the U-shaped insert 44 engages the face of the wall when the block is secured in place. In Fig. 9 the bottom is also of different construction, and is built up in place. After the side walls and one of the end walls are cemented together along their edges, a dish-shaped metal plate 48, having an outwardly projecting flange 49, is slid in place.

The flange 49 rests upon the shoulders 50 formed by recessing the side and end walls of the casket near the bottom thereof. Next, the remaining end wall is put in place and cemented to the adjoining side walls with its shoulder 50 beneath the plate. The flange 49 may have a number of spaced apart lugs 51 welded thereto and engaging the side and end walls when the bottom is in place, and through which lugs the bottom may be mounted by screws passing therethrough if desired. The bottom plate is provided with a plurality of struck-up strengthening ribs 52.

With the parts in the position just described, a layer of the backing or filler material may be applied over the plate 48 and extended up along the side and end walls to provide the sealing and monolithic formation between the walls and bottom. This built-in-place bottom may also be laminated by inserting one or more layers of cloth or wire screen 53 followed by a layer of the plastic material as indicated at 54.

From the foregoing description it will be seen that there have been provided and indicated several different constructions of caskets, purely by way of example, whereby all the objects and advantages recited in this specification are accomplished.

It has been stated above that the plasticising fluid contains sufficient magnesium sulphate to react with the calcium present in the mixture. The purpose of this is to convert the calcium oxide that is present and active into the inert, insoluble, crystalline calcium sulphate which is precipitated in place in and through the mass. The viscosity of the mass at this time is such that the precipitated calcium sulphate does not settle but is at once imprisoned at its many points of formation. Since the calcined magnesite is one of the principal sources of the calcium present in the mix, and since the ingredients are thoroughly mixed both before and after the addition of the plasticising fluid, a uniform distribution of the precipitated calcium is obtained throughout the mass.

One important effect of the presence of this calcium sulphate on the mechanical properties of the article is because the finely and evenly dispersed calcium sulphate forms a lattice work of crystals throughout the mass, by which formation shocks, stresses and strains on the material of the finished product become evenly distributed through a wide area, thus preventing excess loading at any one point. Likewise, the presence of this insoluble, inert, crystalline calcium sulphate results in a finished article which will not crack or warp during the setting or after the setting because in the formation of calcium sulphate, the possibility of the formation of calcium chloride has been eliminated.

It has been found that the finished articles will have the property of mechanically holding in the pores water and water vapor, the presence or absence of which will depend upon the relative humidity of the surrounding air. Articles made according to the above formula, after aging, will readily give up the water held in the pores to the surrounding air of lower relative humidity. If the surrounding air is held at zero percent relative humidity, all of this mechanically held water or water vapor will come out. This breathing action of the material is an important characteristic, not only in connection with water, acids and alkalis, but in the case of burial caskets the breathing action permits gases that may be generated in a closed or sealed casket to escape without damage to the casket or container, and without permitting the passage of water into the casket.

In addition to these materials being water-resistant as pointed out above, they are also resistant to acids, and alkalis, as well as the organic chemicals normally used in the preparation of bodies for burial to preserve the tissues thereof. As is known, formaldehyde is the most common or major ingredient of these latter compounds. Among the normal alkalis to which this material is resistant, are sodium carbonate, sodium hydroxide and slaked lime.

Among the acids are those which result from body decomposition, of which aspartic acid, glycocoll, leucin, racemic acid, salicylic acid, and lysine hydrochloride are typical.

Accordingly, articles made as indicated above will have desirable mechanical properties and structural strength, together with the ability to withstand mechanical shocks, and strains, and to be resistant to substances ordinarily found in polluted atmospheres, water and soil. In addition, they are resistant to the materials normally encountered in use as burial caskets. It is to be understood that we believe that this material is resistant to other acids and alkalis not yet investigated, the foregoing recitation being by way of example.

We also wish to note that other inert fillers may be substituted in the formulae given above with appropriate changes to provide a balanced formula to satisfy the conditions enumerated.

Other modifications may be made in the arrangement and location of parts within the spirit and scope of our invention, and such modifications are intended to be covered by the appended claims. For example, we also contemplate finishing the castings in some instances with an added coating of surface material on all sides of the casting.

We claim:

1. A casket consisting of a cover, side and end panels and bottom, the parts being separately substantially completely formed of a magnesia base plastic composition and assembled together to form the casket, the side and end panels and bottom being cemented together along the meeting faces thereof by a magnesia base cement whereby the faces become united and the parts form a monolithic structure, the cover being hingedly mounted upon one of said panels.

2. A casket comprising a cover, side and end panels and bottom formed of hardenable plastic compositions, said casket having the outer surfaces formed of a layer of composition to provide a hard, smooth, finely textured outer surface, and also having the body formed of a layer of a coarser and more porous composition.

3. A casket comprising a cover, side and end panels and bottom formed of hardenable plastic compositions, said casket having a painted, hard, smooth outer surface composed of said composition and a coarser and more porous inner surface.

4. A casket comprising a cover, side and end panels and bottom formed of hardenable plastic compositions, said casket having a thin, hard, smooth, dense layer of one composition forming an outer surface, and a thick, light weight, less dense body formed of another composition.

5. A casket formed of hardenable plastic compositions, the surface of the body of the casket being formed of a material to produce a hard, smooth, finely textured outer surface, said material having dispersed therethrough a fibrous network, and the inner portion of the body of said casket being formed of a material producing a coarser and more porous surface, said inner material having distributed therethrough one or more layers of mesh-work material.

6. A casket composed of side and end panels, cover and bottom, said parts being formed of a hardenable plastic composition, the side and end panels being provided with mounting blocks formed of hardenable plastic composition and integral with said panels, and hand gripping means mounted in said blocks.

7. A casket composed of side and end panels, cover and bottom formed of a hardenable plastic composition, mounting blocks also formed of a hardenable plastic composition, said blocks being cemented to said panels, and hand gripping means carried by said blocks.

8. A casket composed of side and end panels, cover and bottom formed of a hardenable plastic composition, mounting blocks also formed of a hardenable plastic composition and mounted on said panels, each of said blocks having a U-shaped brace imbedded therein, the sides of each brace having registering apertures therein, and hand gripping means carried by said brace.

9. A casket formed of a hardenable plastic composition comprising side and end panels having a shoulder formed on the inside and near the lower part thereof, a bottom supported upon said shoulders, and an arched cover secured upon and resting upon the tops of said panels, the side and end panels and cover consisting of a plurality of laminations of plastic composition and mesh-work material, and the bottom consisting of a greater number of laminations of plastic composition and mesh-work material.

10. A casket formed of hardenable plastic composition comprising side and end panels having a shoulder formed on the inside and near the lower part thereof, a bottom comprising a metal plate having a flange engaging said shoulder and covered by a layer of plastic material united to said side and end panels, and an arched cover secured to and resting upon the tops of said panels.

11. A casket composed principally of hardenable plastic composition, the walls, cover and bottom thereof being of thin cross section and having a layer of composition material forming a hard, finely textured outer surface capable of being painted, and a backing therefor of coarser, lighter weight, plastic composition, the walls being joined together by a cement forming the same into a monolithic structure, the walls having a shoulder formed on the inside and near the bottom thereof, the bottom formed of hardenable, plastic composition supported upon said shoulders and being bonded with the plastic composition of the side walls, the cover being supported upon the tops of said side walls, and mounting blocks formed of hardenable plastic composition bonded to the side panels, and supporting handles mounted in said blocks.

MURRAY J. MacDONALD.
CARL SCHWENDLER.
FREDERICK C. SCHWENDLER.
CHRISTOPHER S. SCHWENDLER.